(12) United States Patent
Ezekwe

(10) Patent No.: US 9,410,806 B2
(45) Date of Patent: Aug. 9, 2016

(54) SYSTEM AND METHOD FOR GYROSCOPE ZERO-RATE-OFFSET DRIFT REDUCTION THROUGH DEMODULATION PHASE ERROR CORRECTION

(71) Applicant: Robert Bosch GmbH, Stuttgart (DE)

(72) Inventor: Chinwuba D. Ezekwe, Albany, CA (US)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 14/010,163

(22) Filed: Aug. 26, 2013

(65) Prior Publication Data

US 2015/0057959 A1    Feb. 26, 2015

(51) Int. Cl.
*G01P 21/00* (2006.01)
*G01C 19/5776* (2012.01)

(52) U.S. Cl.
CPC .................. *G01C 19/5776* (2013.01)

(58) Field of Classification Search
CPC .............................. G01C 19/56; G01C 19/5776
See application file for complete search history.

(56) References Cited

U.S. PATENT DOCUMENTS

| | | | |
|---|---|---|---|
| 3,625,067 A * | 12/1971 | Emslie | G01C 19/5691 73/504.13 |
| 4,499,436 A | 2/1985 | Grib | |
| 5,289,258 A | 2/1994 | Szafraniec et al. | |
| 5,325,173 A | 6/1994 | Tazartes et al. | |
| 5,347,359 A | 9/1994 | Hutchings et al. | |
| 5,654,906 A | 8/1997 | Youngquist | |
| 5,978,084 A | 11/1999 | Blake | |
| 6,067,858 A | 5/2000 | Clark et al. | |
| 7,127,932 B2 * | 10/2006 | Morell | G01C 19/56 73/1.77 |
| 7,805,993 B2 | 10/2010 | Spahlinger | |
| 8,061,201 B2 | 11/2011 | Ayazi et al. | |
| 8,151,641 B2 | 4/2012 | Geen | |
| 8,578,775 B2 * | 11/2013 | Hayner | G01C 19/5776 329/360 |
| 2007/0144255 A1 | 6/2007 | Handrich et al. | |
| 2007/0194842 A1 | 8/2007 | Hotelling et al. | |

OTHER PUBLICATIONS

Ziomek et al., "Digital I/Q Demodulator", Stanford Linear Accelerator Center; Work supported by Department of Energy, contract DE-AC03-76SF00515; Stanford, USA (3 pages).
International Search Report and Written Opinion corresponding to PCT Application No. PCT/US2014/051665, mailed May 28, 2015 (9 pages).

* cited by examiner

*Primary Examiner* — Elias Desta
(74) *Attorney, Agent, or Firm* — Maginot Moore & Beck LLP

(57) ABSTRACT

A circuit for processing signals from a gyroscope includes a first that generates an in-phase demodulated signal and a second demodulator that generates a quadrature-phase demodulated signal with reference to in-phase and quadrature-phase modulated signals, respectively, from the gyroscope. The circuit includes a digital processor that receives the demodulated in-phase and quadrature phase signals from the demodulators and generates an output signal corresponding to a rotation of the gyroscope along a predetermined axis with reference to the in-phase demodulated signal and the quadrature-phase demodulated signal to remove a portion of the quadrature-phase signal from the in-phase signal.

11 Claims, 2 Drawing Sheets

SYSTEM AND METHOD FOR GYROSCOPE ZERO-RATE-OFFSET DRIFT REDUCTION THROUGH DEMODULATION PHASE ERROR CORRECTION

TECHNICAL FIELD

This disclosure relates generally to gyroscopic sensors and, more particularly, to circuits for correcting error in an output signal from a gyroscopic sensor.

BACKGROUND

Gyroscopes are often used for sensing a rotation or an attitude of an object along one or more axes of rotation. For example, gyroscopes have long been used in naval vessels, aircraft, and spacecraft to identify rotation of the craft and for use in stability control systems. More recently, gyroscopes have been incorporated in micro-electromechanical (MEMS) devices. While classical gyroscopes rotate around an axis, MEMS gyroscopes typically include vibrating elements that are formed using photolithographic processes in an integrated circuit that is suitable for mounting to a printed circuit board or with other electronic components. As the MEMS device rotates around an axis, the plane of oscillation for the vibrating element tends to remain constant, and a modulated electrical signal from the MEMS sensor corresponds to the attitude of the support for the MEMS device around the axis. Some MEMS devices include multiple vibrating gyroscope elements that enable sensing of rotation along multiple axes in a three-dimensional space.

State of the art MEMS gyroscopes are used in a wide range of devices including, but not limited to, smartphones, tablets, and other portable electronic devices. For example, many portable devices include a display screen that displays text and graphics in either a portrait or a landscape orientation. A MEMS gyroscope in the mobile electronic device generates signals corresponding to the rotation of the device between the landscape and portrait orientations, and a microprocessor in the mobile electronic device adjusts the graphical display based on the signals from the gyroscope. Additional uses for MEMS gyroscopes in mobile devices include, but are not limited to, user input and inertial navigation applications.

While MEMS gyroscopes have become popular in compact electronic devices, the structure and operating conditions for existing MEMS gyroscopes introduce errors into the signals that are generated in the gyroscope. For example, the different manufacturing tolerances and fluctuating operating temperatures of MEMS gyroscope generate a quadrature signal error in the output of the signal from the vibrating sensing element in the gyroscope. A demodulation phase error is introduced due to the delays in the mechanical sensing element and electronic components that receive the modulated analog signals from the gyroscopic sensor and generate demodulated digital signals that are suitable for processing with digital microprocessors. Existing solutions for mitigating the offset drift errors include complex closed-loop feedback circuits that increase the cost, complexity, and electrical power consumption of the gyroscopic sensor system. Thus, improvements to circuits that process signals generated in vibrational gyroscopic sensors with reduced offset drift error would be beneficial.

SUMMARY

In one embodiment, a sensor circuit generates output signals corresponding to an output of a gyroscope sensor with the sensor circuit removing some or all of an offset drift from the output signal of the gyroscope. The circuit includes a first demodulator configured to receive a modulated signal from an output of a sensing element in the gyroscope, the first demodulator generating an in-phase demodulated signal with reference to the modulated signal, a second demodulator configured to receive the modulated signal from the output of the sensing element in the gyroscope, the second demodulator generating a quadrature-phase demodulated signal with reference to the modulated signal, and a digital processor configured to receive the demodulated in-phase signal from an output of the first demodulator and the demodulated quadrature-phase signal from an output of the second demodulator. The digital processor is configured to generate an output signal corresponding to a rotation of the gyroscope along a predetermined axis with reference to the in-phase demodulated signal and the quadrature-phase demodulated signal to remove a portion of the quadrature-phase signal from the in-phase signal.

DETAILED DESCRIPTION

Figure 1:
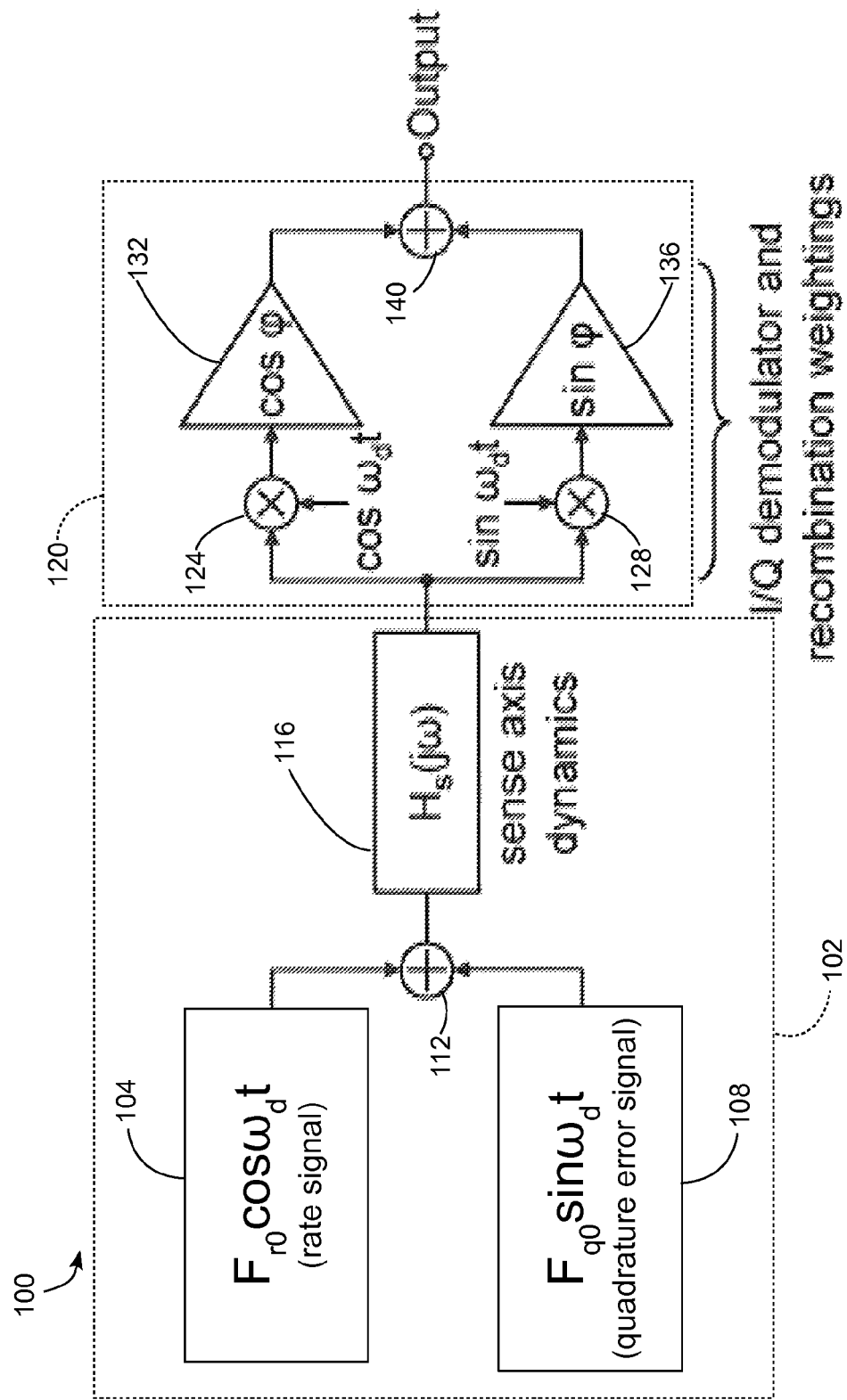
FIG. 1 is a block diagram of functional units in a circuit that monitors an output of one or more axes of a gyroscope and removes an offset drift error from the gyroscope output.

The description below and the accompanying figures provide a general understanding of the environment for the system and method disclosed herein as well as the details for the system and method. In the drawings, like reference numerals are used throughout to designate like elements.

As used herein, the term in-phase signal refers to a signal from a sensor, such as a gyroscope sensor, that carries information from the sensor corresponding to a property that the sensor measures during operation. For example, the in-phase signal from a vibratory gyroscope is a modulated signal that corresponds to a motion of a vibrating element in the gyroscope sensor.

As used herein, the term quadrature-signal refers to another signal from the sensor that has a quadrature phase (90° phase offset) from the in-phase signal. The quadrature-phase signal is also referred to as a quadrature error signal. Ideally, the in-phase signal is completely separated from the quadrature-phase signal. However, in practical circuits, the phase-offset error can make measurement of only the in-phase signal difficult.

As used herein, the term phase-offset error refers to an error in the measurement of signals from a gyroscopic sensor that are produced by a time delay between the generation of the sensor signal and the measurement of the sensor signal. Inherent delays in the sensing elements of a gyroscope or other components in a circuit that measures the signal from sensor produce a phase-offset error. The phase-offset error results in a portion of the quadrature phase signal being shifted in time to overlap with a portion of the in-phase signal. Thus, the phase-offset error results in an inclusion of a portion of the quadrature-phase error signal being included in the measured in-phase signal, which can result in unacceptably large errors in the measurement of the output of the gyroscope. The phase-delay error varies between individual gyroscope sensors and measurement circuits, and can vary over time due to the physical configuration of the gyroscopic sensor on a mounting substrate and due to environmental factors such as ambient temperature. As described in more detail below, a signal processing circuit measures both the in-phase and quadrature-phase signals, and removes a portion of the quadrature-phase signal from the measurements of the in-phase signal to reduce or eliminate measurement errors that the phase-offset error produces in the measured signal from the gyroscopic sensor.

FIG. 1 is a functional diagram of a system 100 that includes a gyroscopic sensor 102 and an in-phase quadrature-phase (I/Q) demodulator 120 that demodulates a modulated output signal from the gyroscopic sensor 102. In the gyroscope a vibrating member oscillates at a predetermined frequency to generate an in-phase modulated force 104 that produces an in-phase rate signal corresponding to a rotation of the gyroscope sensor. The gyroscope 102 also experiences a quadrature-phase force 108 that is phase-shifted by $$90° \left(\frac{\pi}{2} \text{radians}\right)$$

from the in-phase force 104. The quadrature-phase force 108 produces an oscillation in a sense mass 116 whenever the gyroscopic sensing element 102 is in operation. When the gyroscopic sensing element 102 rotates, the in-phase force 104 also produces an oscillation of the sense mass 116 in addition to the quadrature-phase force 108 as a vector sum depicted by the node 112 in FIG. 1. The sense mass 116 oscillates within the gyroscopic sensor 102, and electrodes on the sense mass 116 form a capacitor with fixed electrodes in the gyroscopic sensor 102. When the gyroscopic sensor 102 rotates, both the in-phase force 104 and quadrature-phase force 108, which are summed at the node 112 for illustrative purposes in FIG. 1, introduce a modulated motion of the sense mass 116 other than the natural oscillation of the sense mass 116. The modulated motion of the sense mass 116 generates a modulated capacitance signal within the gyroscopic sensor 102 that can be measured using electrical circuits.

The sense mass 116 is characterized by a transfer function $H_s(j\omega)$. The sense mass 116 oscillates in response to the rate and quadrature forces. The sense mass 116 experiences a delay in oscillation when acted upon by the rate and quadrature forces that produce an oscillating motion in the sense mass 116 during rotation of the gyroscope. The delay produces a phase-offset error that results in a portion of the quadrature-phase signal 108 being measured during the measurement of the in-phase signal 104. The phase-offset error is approximated with the following equation: $\phi \approx \phi(T_0)f(T_0, T)$, where $T_0$ is a predetermined reference temperature, and T is the current operating temperature of the gyroscope. The value of $\phi(T_0)$ is identified empirically through a calibration process at the reference temperature $T_0$, such as during manufacture of the gyroscope or through a calibration process. The function $f(T_0, T)$ is approximated as $f(T_0, T) \approx c_0 + c_1 T$ where $c_0 = b_0 k T_0$ and $c_1 = b_1(a_0 T_0 + a_1 T_0^2 + a_2 T_0^3 \ldots a_n T_0^{n+1})$. The numeric values of the coefficients $b_0, b_1$, and $a_0 \ldots a_n$ are identified empirically during a calibration process that measures samples from the gyroscope while the gyroscope operates at the reference temperature $T_0$.

In the system 100, the in-phase demodulator 124 generates a demodulated signal corresponding to the in-phase component of the output signal from the sense mass 116. In the configuration of FIG. 1, the in-phase module 132 introduces a unity gain to the demodulated in-phase signal from the demodulator 124. In another configuration, the gain of the in-phase module 132 corresponds to the value of $\cos(\phi)$ instead of the unity gain. The quadrature-phase demodulator 128 generates the demodulated quadrature-phase signal. The phase change of $\phi = -\phi$ corresponding to the identified phase error $\phi$. Thus, the phase-offset error correction module 136 multiplies the demodulated quadrature-phase signal by a scaling factor of $\phi = -\phi$, which corresponds to the identified phase error $\phi$, with a negative (−) scaling factor that is used to subtract a portion of the demodulated quadrature-phase signal from the corresponding in-phase signal. The I/Q demodulator 120 removes a portion of the quadrature-phase signal that is included in the measured in-phase signal due to the phase delay error. An adder 140 generates an output signal from the combined in-phase and scaled quadrature-phase demodulated signals. In the embodiment of FIG. 1, the adder 140 generates the difference between the in-phase demodulated signal and the scaled quadrature-phase demodulated signal. In another configuration, the adder unit 140 is a subtraction unit that generates a difference between the in-phase signal and the scaled quadrature-phase signal when the scaling factor $\phi = \phi$ instead of the $\phi = -\phi$ scaling factor that is illustrated in FIG. 1.

Figure 2:
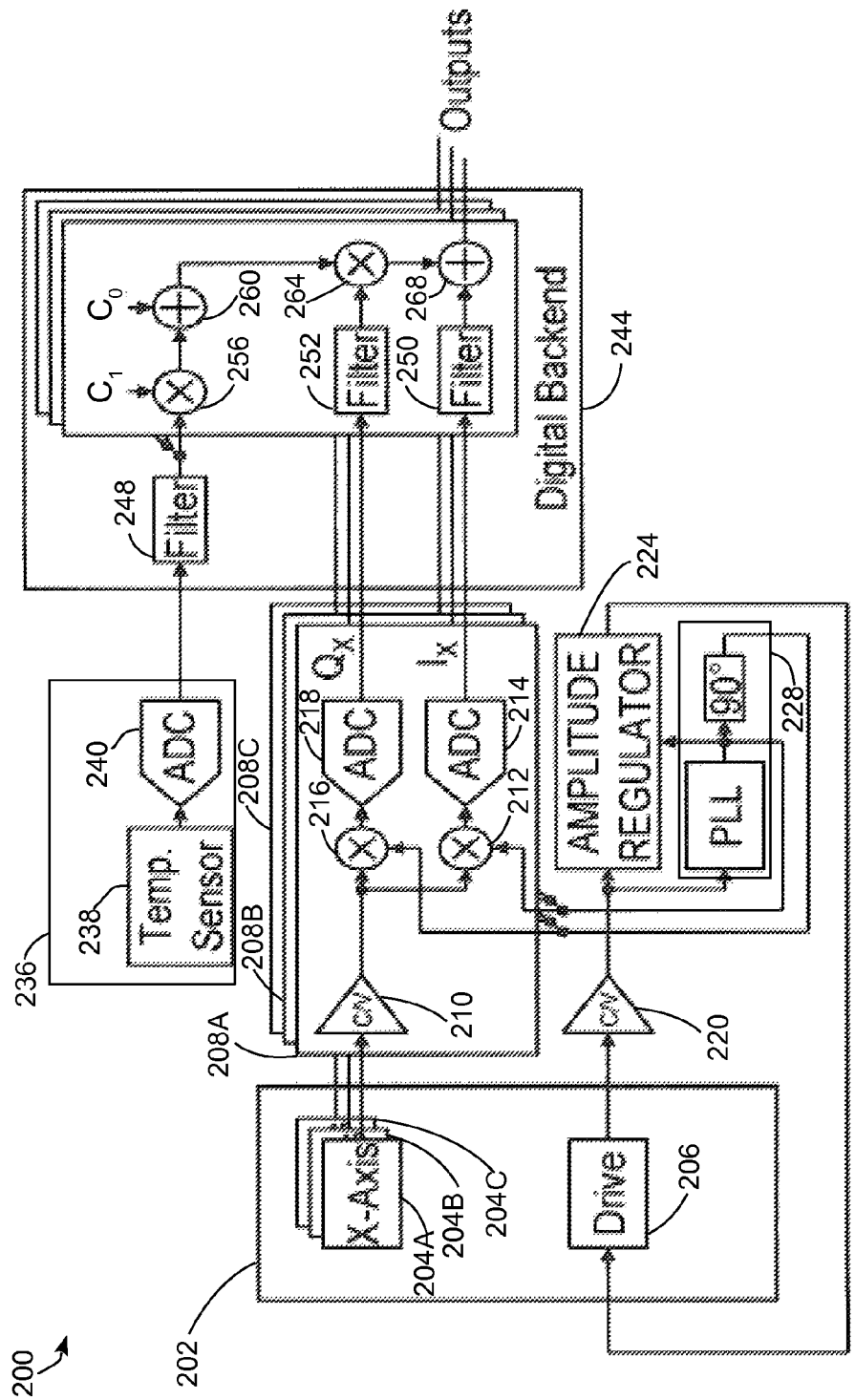
FIG. 2 is a schematic diagram of a circuit that monitors outputs of a gyroscope along one or more axes and removes an offset drift error from the gyroscope output.

FIG. 2 is a schematic diagram of one embodiment of system 200 including an I/Q demodulator that is electrically connected to an output of a vibratory gyroscope to reduce or eliminate phase delay error in the output signal of the gyroscope. The system 200 includes a gyroscopic sensing element 202, sensing channels 208A, 208B, and 208C, capacitance to voltage converter 220, amplitude regulator 224, phase-lock loop (PLL) 228, a temperature sensor 236, and a digital processing device 244.

In the system 200, the sensing element 202 is a vibratory gyroscope such as a MEMS gyroscope that is used in mobile electronic devices or any other suitable vibratory gyroscope. In the embodiment of FIG. 2, the sensing element 202 includes a sensing element that senses rotation about three sensing axes 204A, 204B, and 204C, each of which is configured to generate a signal corresponding to the motion of a vibrating element and corresponding rotation of the gyroscope along each of an x, y, and z axis, respectively. The x, y, and z axes correspond to three orthogonal axes of rotation in the physical world. In another embodiment, the gyroscope includes only one axis or a different configuration of multiple sensing elements that are arranged on multiple axes. A drive axis 206 receives an electric drive signal that generates oscillation in the vibrating members of each of the sensing axes 204A, 204B, and 204C. The drive axis 206 drives the sense mass at a predetermined frequency to enable each of the axes 204A-204C to oscillate at a predetermined frequency.

In FIG. 2, the sensing channel 208A is electrically connected to the output of the sensing axis 204A. The sensing channel 208A includes a capacitance to voltage converter 210 that generates a voltage signal in response to a modulated electrical capacitance output from the sensing axis 204A. In one embodiment, the PLL 228 is implemented using a wideband type-II semiconductor PLL formed with a low phase-noise property to prevent reciprocal mixing of the quadrature error signal with the demodulation clock signal. In the system 200, the sensing channels 208B and 208C are configured in the same manner as the sensing channel 208A to generate digital data corresponding to demodulated signals from the sensing axes 204B and 204C, respectively. The sensing channel 208A further comprises an I/Q demodulator that includes an in-phase demodulator 212 and a quadrature-phase demodulator 216. Both the in-phase demodulator 212 and quadrature-phase demodulator 216 are electrically connected to the output of the capacitance to voltage converter 210 to receive the modulated output voltage signal from the sensing axis 204A. In the embodiment of FIG. 2, the in-phase demodulator 212 and quadrature-phase demodulator 216 are implemented as chopper circuits that demodulate the output of the capacitance to voltage converter 210 in response to switching signals from the in-phase and quadrature-phase outputs of the PLL 228. As described in more detail below, the in-phase demodulator 212 is connected to the in-phase output of the PLL 228, and the quadrature-phase demodulator 216 is connected to the quadrature output of the PLL 228 with a $$\frac{\pi}{2} \text{radians}$$

(90°) phase offset from the in-phase output signal. The in-phase demodulator 212 and quadrature-phase demodulator 216 generate demodulated analog signals corresponding to the in-phase and quadrature-phase components, respectively, of the modulated output signal from the sensing axis 204A. Analog to digital converters (ADCs) 214 and 218 generate digital output data corresponding to the outputs of the demodulators 212 and 216, respectively. In one embodiment, the ADCs 214 and 218 are delta-sigma modulators that include single-bit fourth order ADC 214 and second order ADC 218 that oversample the analog signals from the demodulators 212 and 216.

In the system 200, the drive axis 206 receives an electrical drive signal from an amplitude regulator circuit 224. The amplitude regulator circuit 224 controls the amplitude of the electrical drive signal for the drive axis 206 in the sensing element 202, which maintains the amplitude of the oscillation for the sensing element 202 at a predetermined level. The PLL 228 and the amplitude regulator 224 controls the drive axis 206 in a closed-loop configuration, with the output of the drive axis 206 being supplied to a capacitance to voltage converter 220 that generates an output voltage corresponding to the oscillation of the drive axis 206. The PLL 228 receives the output signal from the capacitance to voltage converter 220 and generates a tracking signal output to control the frequency and phase of the signal to the drive axis 206. The PLL 228 generates a time varying signal that tracks the inherent frequency of oscillation of the moving member in the gyroscopic sensing element 202. The PLL 228 generates an in-phase output signal that controls the operation of the amplitude regulator 224 to operate the drive axis 206, and the in-phase output signal from the PLL 228 also controls the in-phase demodulator 212. The PLL 228 includes a phase-delay circuit that generates a shifted quadrature-phase output with a shifted-phase of $$\frac{\pi}{2} \text{radians}$$

(90°) from the in-phase signal to control the operation of the quadrature-phase modulator 216.

In the system 200, the drive axis 206 and the demodulators 212 and 216 are all driven by the output signals from a single PLL 228. As described above, the sensing axes 204A-204C and other components in the system 200 introduce a phase-offset error in the in-phase and quadrature-phase output signals from the sensing element 202. The in-phase and quadrature-phase signals from the PLL 228 are also supplied to the demodulators 212 and 216. Prior-art sensing circuits attempt to filter or separate the quadrature-phase signal from the in-phase signal since only the in-phase signal includes useful information from the sensing element in the gyroscope 200. In the system 200, however, the quadrature-phase component of the signal from the sensing element 202 is not discarded. Instead, the quadrature-phase demodulator 216 and ADC 218 generate digital data corresponding to the demodulated quadrature-phase signal. As described in more detail below, the demodulated quadrature-phase signal is scaled according to the phase-offset error in the system 200, and the scaled quadrature-phase signal component is removed from the in-phase component of the output signal to reduce or eliminate the effects of the phase-offset error in an output signal.

In the system 200, the temperature sensor 236 includes a temperature sensing element 238 and an ADC 240. In one embodiment, the temperature sensing element 238 is a proportional-to-absolute temperature (PTAT) sensor element. The temperature sensing element 238 generates an analog signal corresponding to the temperature of the sensing element 202, and the ADC 240 converts the analog signal into a digital data for additional processing by the processor 244. In one embodiment, the ADC 240 is an incrementally operated second-order delta-sigma modulator. The temperature sensor 236 provides temperature data that are used to identify a scaling factor for the quadrature-phase demodulated signal data. The magnitude of the phase-offset error and corresponding overlap between the measured in-phase signal and the quadrature-phase error signal depend upon the temperature of the sensing element 202.

In the system 200, the digital processor 244 is embodied as a microprocessor, microcontroller, digital signal processor (DSP), application specific integrated circuit (ASIC), field programmable gate array (FPGA), or any other digital processing device that is configured to receive digital demodulated signal data from the in-phase ADC 214, quadrature-phase ADC 218, and the temperature sensor ADC 240. In one embodiment, the entire system 200 including the mechanical sensing element 202, the sensing channels 208A-208C, temperature sensor 236, amplitude regulator 224, PLL 228, and the digital backend 244 are integrated into a single physical package using, for example, a CMOS process, MEMS process. Additional embodiments include combinations of the mechanical, analog electrical, and digital electronic components of the system 200. In the embodiment of FIG. 2, the digital processor 244 is further configured to receive data from ADCs in the sensing channels 208B and 208C to enable monitoring of the sensing axes 204B and 204C, respectively, in the sensing element 202.

FIG. 2 depicts a schematic configuration of the operations that the digital processor 244 performs to generate digital output data corresponding to the signal from the sensing element 202. In the embodiment of FIG. 2, the processor 244 applies low-pass filters 248, 250, and 252 to the digital data from the temperature sensor 236, in-phase demodulator 212, and quadrature-phase demodulator 216, respectively. The processor 244 multiplies the filtered output reading of the temperature sensor 236 by the constant value $c_1$ with the multiplier 256 and adds the constant value $c_0$ with the adder 260. The values of the constants $c_0$ and $c_1$ are predetermined constants that are stored in a memory associated with the digital processor 244 and are described above with reference to the function $f(T_0,T)$. The output of the adder 260 corresponds to the result of the $f(T_0,T)$ equation where T is the capacitance temperature reading for the sensing element 202 that is received from the temperature sensor 236. The processor 244 includes a multiplier 264 that multiplies the output of the adder 260 by the digital data corresponding to the quadrature-phase demodulated signal from the filter 252 to generate digital data corresponding to a scaled version of the demodulated quadrature-phase signal data. As described above, the multiplier 264 also introduces a negative factor ($\phi = -\phi$) to the multiplication process to produce a negative scaled value corresponding to the demodulated quadrature-phase signal data.

The digital processor 244 uses an adder 268 to add the digital data for the in-phase signal from the filter 250 to the scaled quadrature-phase error signal output of the multiplier 264 to generate a combined output signal. The combined output signal from the adder 268 corresponds to a difference between the measured in-phase signal and scaled quadrature-phase error signal. Thus, since the phase-offset error in the system 200 introduces a portion of the quadrature-phase error signal into the in-phase signal, the digital processor 244 removes the quadrature-phase component from the in-phase demodulated signal data with the adder 268. As described above, the digital processor 244 dynamically adjusts the scaling factor based on the temperature data from the temperature sensor 236 and with reference to calibration data for the gyroscopic sensing element 202 to compensate for changes in the phase-offset error that occur during operation of the system 200. In one embodiment, the digital processor 244 executes stored program instructions as part of a software program to perform the functions of the filters 248, 250, and 252, multipliers 256 and 264, and the adders 260 and 268.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A circuit for processing signals from a gyroscope comprising:
    a first demodulator configured to receive a modulated signal from an output of a sensing element in the gyroscope, the first demodulator generating an in-phase demodulated signal with reference to the modulated signal;
    a second demodulator configured to receive the modulated signal from the output of the sensing element in the gyroscope, the second demodulator generating a quadrature-phase demodulated signal with reference to the modulated signal; and
    a digital processor configured to receive the demodulated in-phase signal from an output of the first demodulator and the demodulated quadrature-phase signal from an output of the second demodulator, the digital processor being configured to:
        generate an output signal corresponding to a rotation of the gyroscope along a predetermined axis with reference to the in-phase demodulated signal and the quadrature-phase demodulated signal to remove a portion of the quadrature-phase signal from the in-phase signal.

2. The circuit of claim 1, the digital processor being further configured to:
    generate a scaled datum corresponding to a product of a datum of the quadrature-phase signal multiplied by a scaling factor to reduce an absolute value of the digital datum;
    generate the output signal with another datum corresponding to a difference between a datum corresponding to the in-phase signal and the scaled datum.

3. The circuit of claim 2 further comprising:
    a temperature sensor configured to generate a signal corresponding to a temperature of the gyroscope.

4. The circuit of claim 3, the temperature sensor further comprising:
    a proportional to absolute temperature (PTAT) sensor element; and
    an analog to digital converter (ADC) electrically connected to an output of the PTAT sensor element and configured to generate digital temperature data corresponding to the signal generated by the PTAT.

5. The circuit of claim 3 wherein the digital processor is operatively connected to an output of the temperature sensor and the digital processor is further configured to:
    receive data corresponding to the temperature of the gyroscope from the temperature sensor;
    adjust the scaling factor with reference to the temperature of the gyroscope; and
    multiply the datum corresponding to the quadrature-phase signal by the adjusted scaling factor to reduce an absolute value of the digital datum corresponding to the quadrature-phase signal.

6. The circuit of claim 1 further comprising:
    a phase lock loop circuit operatively connected to the first demodulator and the second demodulator, the phase lock loop being configured to:
    receive a signal corresponding to motion of a drive axis in the gyroscope;
    generate a first signal to control the first demodulator, the first signal being generated with a first phase at a predetermined frequency in response to the signal from the drive axis; and
    generate a second signal with a second phase at the predetermined frequency to control the second demodulator, the second phase being different than the first phase.

7. The circuit of claim 6 wherein the second phase differs from the first phase by approximately $\pi/2$ radians.

8. The circuit of claim 6 further comprising:
    a capacitance to voltage converter electrically connected to an output of the drive axis in the gyroscope; and
    the phase lock loop circuit being electrically connected to an output of the capacitance to voltage converter to enable the phase lock loop circuit to receive the signal from the drive axis in the gyroscope.

9. The circuit of claim 1 further comprising:
    a capacitance to voltage converter electrically connected to the output of the sensing element in the gyroscope;
    the first demodulator being electrically connected to an output of the capacitance to voltage converter to receive the modulated signal from the capacitance to voltage converter; and
    the second demodulator being electrically connected to the output of the capacitance to voltage converter to receive the modulated signal from the capacitance to voltage converter.

10. The circuit of claim 1 further comprising:
    a first ADC electrically connected to the output of the first demodulator and configured to generate digital data corresponding to the in-phase demodulated signal;
    a second ADC electrically connected to the output of the second demodulator and configured to generate digital data corresponding to the quadrature-phase demodulated signal; and the digital processor being connected to an output of the first ADC to receive the digital data corresponding to the in-phase demodulated signal and the digital processor being connected to an output of the second ADC to receive the digital data corresponding to the quadrature-phase demodulated signal.

11. The circuit of claim 10 wherein the first ADC and the second ADC are delta-sigma modulators.

* * * * *